3,044,986
LINEAR ORGANIC SATURATED NON-IONIC HOMOPOLYMERS OF SYMMETRICAL 1,6-DIOLEFINIC MONOMERS

George B. Butler, Gainesville, Fla., assignor to Peninsular Chem Research, Inc., Gainesville, Fla., a corporation of Florida
No Drawing. Filed Mar. 10, 1958, Ser. No. 720,040
11 Claims. (Cl. 260—63)

This invention relates to linear organic saturated non-ionic homopolymers which are formed directly from symmetrical 1,6-diolefinic monomers. These polymers are characterized by recurring six-membered rings linked to each other by methylene groups. The chain structure may be represented by the following formula:

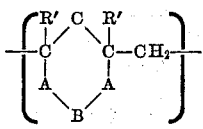

wherein A represents a methylene or carbonyl radical; B represents a $-CH_2-$, $-CH(R)-$, $-C(R)_2-$,
$-C(\overset{O}{\overset{\|}{C}}-R)_2-$, $-C(\overset{O}{\overset{\|}{C}}-R)(\overset{O}{\overset{\|}{C}}-OR)-$, $-C(\overset{O}{\overset{\|}{C}}-OR)_2$, $-C-$
$-SiH_2-$, $-Si(R)_2-$, $-Si(R)(OR)-$, $-P(R)-$,
$-\overset{R}{\overset{|}{P}}(O)-$ etc. radical; R represents an alkyl radical; R' represents an alkyl, aryl, halogen, or cyano radical.

This invention also provides a free radical homopolymerization process for the production of the above polymeric materials.

The generally accepted theories of free radical catalyzed polymerization of olefins would predict that diolefins, having a functionality of 4, would produce cross-linked thermosetting polymers rather than linear thermoplastic polymers. For example, while styrene, a monomer having a functionality of 2, will polymerize to form a linear polymer, soluble in benzene, if as little as 0.01% of para-divinyl benzene, a monomer having a functionality of 4, is present, the product from the polymerization is not soluble in benzene. That is, a cross-linked material has been produced instead.

In the present invention, although the monomers employed have a functionality of 4, nevertheless it has been found that a linear polymer of a particular sort is produced. The discovery of this completely unexpected and unpredictable result has led to the preparation and production of the novel linear thermoplastic polymers which form the subject matter of this invention.

As indicated above, the structure of the novel polymers shows a repeating unit of a six-membered ring. This structure has been shown to exist by various procedures. Thus, degradation studies have been carried out to show that a six-membered ring is present in molecule, and infrared, etc., evidence also confirms the structure.

This unusual structure in the polymeric material appears to result from the following mechanism:

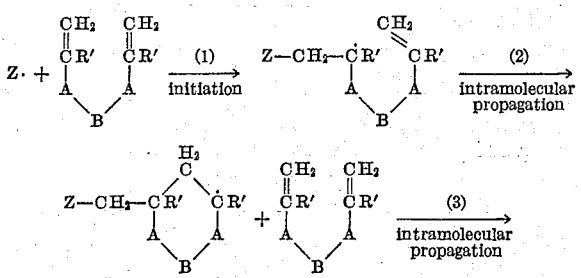

wherein Z· is a free radical and A, B, R, and R' have the meaning given above.

In order for this mechanism to take place, it is important that the unsaturated monomer be substantially symmetrical, particularly as respects the double bond positions. Where a 1,6-diolefinic material is used which has two double bonds of different reactivity, a cross-linked polymer may be expected. For instance, allyl acrylate, and similar materials such as methallyl methacrylate, etc., have one reactive double bond and one comparatively unreactive double bond and do not yield the novel polymers of this invention. It is also important that the unsaturation specifically be a 1,6-di-unsaturation for neither 1,5 nor 1,7 diolefins, for instance, will result in the linear thermoplastic ring-containing polymer. While normally five-membered rings are considered to form about as easily as six-membered rings, in the case of 1,5-diolefins, it has been found that the cross-linking reaction takes place in preference to the ring-forming reaction. In the case of 1,7-diolefins, a similar effect is observed as respects the relative ease of formation of the seven-membered ring.

Examples of the 1,6-diolefinic monomers which may be used in my invention include: diallyl ketone, dimethallyl ketone, bis(2-chloroallyl)ketone, bis(2-cyanoallyl)ketone; bis(2-phenylallyl)ketone; 1,6-heptadiene-3,5-dione; 4,4-dimethyl-1,6-heptadiene-3,5-dione, 4,4-diethyl-1,6-heptadiene-3,5-dione; 1,6-heptadiene; 4,4-dimethyl-1,6-heptadiene; diallyl silane; dimethallyl silane; bis(2-chloroallyl) silane; diallyl-dimethyl silane; diallyl-diethyl silane; diallyl-methyl-ethoxy silane; dimethallyl-dimethyl silane; bis(2-chloroallyl)-methyl-ethoxy silane; diallyl-methyl phosphine; diallyl-ethyl phosphine; dially methyl phosphine oxide; dimethallyl-methyl phosphine; bis(2-chloroallyl)-methyl phosphine; bis(2-cyanoallyl)-ethyl phosphine oxide; 3,3-diallyl diethyl malonate; 3,3-dimethallyl dimethyl malonate; 3,3-bis(2-chloroallyl) dibutyl malonate; 3,3-diallyl ethyl acetoacetate; 3,3-dimethallyl ethyl acetoacetate; 3,3-diacetyl-1,6-heptadiene, 3,5-divinylheptane-2,6-dione; 4,6-divinyloctane-3,7-dione, etc. It will be noted that the last two named monomers will form a ring-containing polymer where A represents an acyl-substituted methylene group.

In addition, various other monomers may also be used in my invention. These include, for instance, symmetrical diallylic compounds where the two allylic groups are linked to a metallic atom such as selenium, titanium, arsenic, germanium, tin, lead, zinc. etc. These organo-metallic diolefin monomers will yield, of course, polymers where the metallic atom will appear at B in the above structural formula.

Generally, these polymers are useful as film- and fiber-forming polymers and have a molecular weight from about 5,000 to 30,000. As is observed with polyterephthalic esters, my polymers, which also contain a cyclic structure, are higher melting than generally related non-cyclic polymers and this property is particularly useful in film and fiber applications thereof. In addition, various of my polymers will have special uses. For instance, those polymers containing a chlorine atom are flame-resistant materials and those polymers containing a nitrile group are less soluble in hydrocarbon solvents and, accordingly, have greater resistance to lubricating oils. Where a silicon atom is present, the polymer will have high temperature resistance properties and polymers

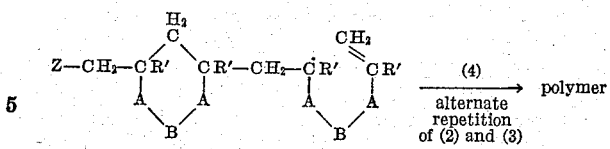

prepared from allylic phosphine derivatives are useful as non-flammable lubricants. In cases where an organo-metallic diolefin monomer is employed, as listed above, the resulting polymer will have various uses according to the nature of the metallic atom. Thus, where titanium is present, a polymer useful as a pigment is obtained. With selenium, high temperature lubricant antioxidant polymers are formed. The polymers made from arsenic-containing monomers can be used as oxidation-reduction agents and can also be used as medicinals. With germanium as the heterocyclic atom in the polymeric ring, high temperature resistance is again obtained in the polymer. The lead-containing polymers can be used as non-volatile anti-knock agents. A zinc-containing diallylic monomer will proved spontaneously flammable polymers; and where tin is used, the polymers are again useful as oxidation-reduction agents.

The process for producing my polymers will generally correspond to general practices followed for free radical olefinic polymerizations. It is of particular value to use peroxygen catalysts such as di-tertiary butyl peroxide. Other peroxide catalysts include inorganic peroxides such as hydrogen peroxide and barium peroxide, etc.; and organic peroxides such as various dialkyl peroxides, alkyl hydrogen peroxides, and diacyl peroxides such as acetyl peroxide and benzoyl peroxide as well as peracids, such as peracetic acid and perbenzoic acid and salts of inorganic peracids such as ammonium and potassium persulfate. Cyclic peroxides can also be used such as tetralin hydroperoxide and cumene hydroperoxide. Other "free radicals" catalysts such as azo compounds, e.g. azoisobutyronitrile, and oxygen may be employed as a polymerization catalyst.

The polymerization of the monomers may be carried out directly on the monomer, i.e. at 100% concentration, or the reaction may be performed in a suitable solvent for the monomer or in a dispersion or emulsion of the monomer-solvent system. Generally, any solvent, which is a solvent for the monomer, may be used in the polymerization reaction. Examples of such solvents include benzene, toluene, dioxane, ethers of ethylene glycols such as dimethyl ethylene glycol, diethyl ethylene glycol, etc., alcohols, such as methanol, ethanol, propanol, etc., and ketones such as acetone, methyl ethyl ketone, diethyl ketone, and esters such as methyl acetate, ethyl acetate, ethyl propionate, etc. It is important, of course, that the solvent used be aliphatically saturated in order to avoid any cross-linking between the forming polymer and the solvent itself. Those skilled in the art will understand that the hydrocarbon solvents are most appropriate for the hydrocarbon monomers and that the more polar solvents such as the esters, ketones, and alcohols, are most suitable for use with those monomers containing carbonyl groups and/or ester radicals.

The temperatures used in the polymerization may vary from about 0° to 100° C., preferably between about 50° and 75° C. Where the reaction is continued at atmospheric pressure, the boiling point of the solvent will obviously provide an upper limit to the reaction, and the reaction may be carried out under reflux. On the other hand, the reaction can also be conducted under autogenous pressure conditions. Generally speaking, there is no critical limitation to the temperature or the pressure for the reaction other than the decomposition temperature for the monomer and, as just indicated, the boiling point of the solvent. Generally, the reaction will be completed within a necessary period of time from about 1 to 24 hours, depending on the temperature used in the usual fashion. Longer times may, of course, be used as for instance several days. Being a linear non-crosslinked material, the polymer formed will be soluble in some of the solvents above enumerated. However, in some cases, it will precipitate from the reaction mixture to some degree. In any event, isolation or recovery of the polymers may be carried out by simply removing the solvent from the reaction mixture.

In addition to using the peroxide catalysts mentioned above, a further embodiment of my invention involves the use of a Ziegler-type catalyst. The general technique of carrying out the reaction will be the same as where a peroxygen catalyst was used, but the Ziegler-type catalyst will be most advantageous for the polymerization of those monomers which do not contain oxygen or similar electron donors. Generally, any Ziegler-type catalyst may be used. These are enumerated in Belgian patent, 713,081, to Ziegler, and include a mixture of a metal compound, where the metal is a group IVa, Va, or VIa metal with a beryllium or aluminum alkyl or aryl compound, or a beryllium or aluminum alkyl hydride or aryl hydride. Of the metal compounds forming the first component of the mixture titanium tetrachloride is preferred and the preferred beryllium compound is dibutyl beryllium. Various alkyls, aluminums, and berylliums may be, of course, used with satisfactory results. In addition, magnesium and zinc alkyls may be used in place of the beryllium or alkyls. Among the group IVa, Va, and VIa metals which can be used, there may be mentioned zirconium, thorium, vanadium, chromium, molybdenum, tantalum, niobium, etc., in the form of their chlorides, alkyls, hydrated oxides, bromides, acetates, acetylacetonates, oxalates, phosphates, oxybromides, etc.

When either a Ziegler-type catalyst or a peroxygen catalyst is employed, the catalyst will be, of course, used in a conventional catalytic amount. Conveniently, the amount of catalyst used may be within the range from about 0.5 to about 20%, but generally for purposes of effectiveness of the reaction and economy, no more than about 8% by weight of the monomer may be used.

The following examples will illustrate the principles of my invention, but it will be understood that it is not limited to the specific embodiments shown therein. The nomenclature adopted with respect to the reference numbers indicated as "-(3,(5)-" is designed to point out that the linking methylene groups are attached to the 3 and 5 carbon atoms of respectively adjacent rings and to distinguish the polymers from a material having a "-3,5-" methylene bridge across a single one of the rings.

EXAMPLE I

*Poly-(3,(5)-Methylene Cyclohexanone*

Ten grams of diallyl ketone was stirred with 0.5 gram of di-tert.butyl peroxide and heated at a temperature of about 50° C. for 12 hours. At the end of this time, a high melting polymer was obtained which was soluble in chloroform, consistent with its linear nature.

EXAMPLE II

*Poly-(3,(5)-Methylene-3,5-Dichlorocyclohexanone*

Ten grams of bis(2-chloroallyl) ketone was homopolymerized according to the procedure of Example I and a solid soluble polymer was obtained.

EXAMPLE III

*Poly-(3,(5)-Methylene-3,5-Dicyanocyclohexanone*

Ten grams of bis(2-cyanoallyl)ketone was homopolymerized according to the procedure of Example I and a solid soluble polymer was obtained.

EXAMPLE IV

*Poly-(3,(5)-Methylene-3,5-Diphenyl Cyclohexanone*

Ten grams of bis(2-phenylallyl)ketone in 5 grams of benzene was homopolymerized in the presence of 0.6 gram of peracetic acid at a temperature of about 72° C. for about 12 hours. A solid chloroform-soluble polymer was isolated from the reaction mixture.

EXAMPLE V

*Poly-(3,(5)-Methylene-1,1-Dimethyl-Silicinane*

Ten grams of diallyl dimethyl silane was polymerized according to the procedure of Example IV. The solid linear polymer was obtained. Poly-(3,(5)-methylene-(3)diethylplumbinane may be similarly made from diallyl diethyl lead. This polymerization reaction is also carried out successfully where instead of peracetic acid a Ziegler-type catalyst is used, such as a mixture of chromic acetylacetonate and aluminum tributyl.

EXAMPLE VI

*Poly-(3,(5)-Methylene-3,5-Dichloro-1-Methyl-Phosphorin*

Ten grams of bis (2-chlorallyl)-methyl phosphine was polymerized according to the procedure of Example IV and the solid linear polymer was obtained.

EXAMPLE VII

*Poly-(3,(5)-Methylene-3,5-Dichloro-1,1-Dicarbethoxy Cyclohexane*

Diethyl malonate was alkylated in the usual manner with 2,3-dichloropropene to produce 2,6-dichloro-4,4-dicarbethoxy-1,6-heptadiene. This compound was then heated at 150° C. for one hour in the presence of oxygen to produce a solid polymer which was soluble in acetone.

EXAMPLE VIII

*Poly-(3,(5)-Methylene-3,5-Dimethyl-1-Acetyl-1-Carbethoxy-Cyclohexane*

Ten grams of 3,3-dimethallyl ethyl acetoacetate was polymerized in the presence of 0.7 gram of azoioisobutyronitrile in 6 ml. of ethylacetate in a sealed tube at 150° C. for one hour. A solid soluble polymer was obtained. Similar results were achieved when ethyl alcohol was used in place of ethyl acetate.

EXAMPLE IX

*Poly-(3,(5)-Methylene-3,5-Dimethyl-Cyclohexane*

Ten grams of dimethallylmethane in 10 grams of toluene was treated at 50° C. for two days with a catalyst comprising approximately equal quantities by weight of titanium-tetrachloride and beryllium diethyl. A solid linear polymer soluble in chloroform was obtained.

It will be appreciated that, while my invention has been described with reference to certain specific embodiments thereof, the principle and scope thereof is limited only by the following claims.

I claim:

1. A linear film- and fiber-forming homopolymer having repeating units, selected from the group consisting of one of the structures:

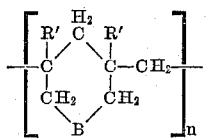

and

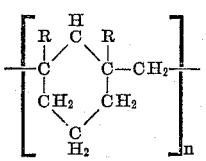

wherein

B is selected from the class consisting of

—Si(CH$_3$)$_2$—, —P(CH$_3$)—, —C(CO$_2$Et)$_2$— and —C(COCH$_3$)(CO$_2$Et)—;

R' is selected from the class consisting of hydrogen, chlorine cyano, phenyl and methyl; and, R is methyl, n is a positive integer.

2. A homopolymer according to claim 1, wherein the repeating unit has the formula:

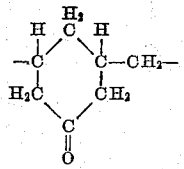

3. A homopolymer according to claim 1, wherein the repeating unit has the formula:

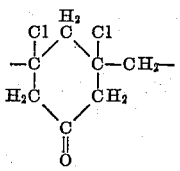

4. A homopolymer according to claim 1, wherein the repeating unit has the formula:

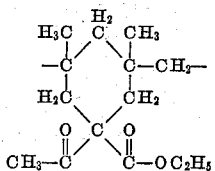

5. A homopolymer according to claim 1, wherein the repeating unit has the formula:

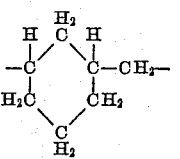

6. A linear film- and fiber-forming homopolymer having a repeating unit of the structure:

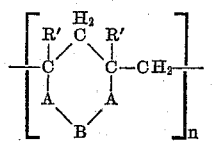

wherein A is a grouping selected from the class consisting of —CH$_2$— and

B is a member selected from the group consisting of —SiH$_2$— and —SiR$_2$—, wherein R is lower alkyl; and R' is a radical selected from the group consisting of hydrogen, lower alkyl, monocyclic aryl, halogen and cyano, and n is an integer representing the number of units in the polymeric chain.

7. A process for the preparation of a linear fiber- and film-forming homopolymer having a repeating unit of the structure:

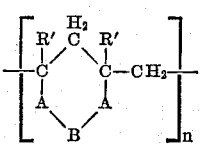

wherein A is a grouping selected from the class consisting of —CH$_2$— and

B is a member selected from the group consisting of —$CH_2$—, —$CH(R)$—, —$C(R)_2$—,

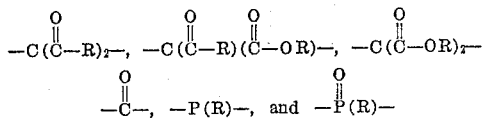

—$\overset{O}{\underset{\|}{C}}$—, —$P(R)$—, and —$\overset{O}{\underset{\|}{P}}(R)$— provided that only one of A and B stand for

at the same time; R represents a lower alkyl substituent; and R' is a radical selected from the group consisting of hydrogen, lower alkyl, monocyclic aryl, halogen, and cyano, and $n$ is an integer representing the number of units in the polymeric chain; which comprises homopolymerizing a 1,6-diolefinic compound having the formula:

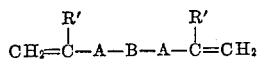

wherein A, B, and R' have the meanings indicated above, in the presence of a catalyst selected from the group consisting of (1) free radical yielding catalysts and (2) a mixture of a salt of a metal selected from the group consisting of groups IV$a$, V$a$, and VI$a$ of the periodic table and an organometallic compound selected from the group consisting of alkyl and aryl compounds of beryllium, aluminum, magnesium and zinc.

8. The process of claim 7, wherein said homopolymerization is carried out in a solvent for said 1,6-diolefinic compound.

9. The process of claim 7, wherein said homopolymerization is carried out at a temperature below the decomposition temperature of said 1,6-diolefinic compound.

10. The process of claim 7, wherein said temperature is between about 0 and 100° C.

11. The process of claim 8, wherein said temperature is between about 15° and 75° C.

References Cited in the file of this patent
UNITED STATES PATENTS
2,976,268     Milford et al. _____ Mar. 21, 1961

FOREIGN PATENTS
776,326     Great Britain _____ June 5, 1957

OTHER REFERENCES
Marvel et al.: Journal American Chemical Society, 79, 5771, 1957.
Marvel et al.: Journal American Chemical Society, 80, 1740, 1958.
Report of American Chemical Society, Chemical and Engineering News, vol. 24, 1233–36, May 10, 1946.